(12) United States Patent
Goyal et al.

(10) Patent No.: US 11,640,723 B2
(45) Date of Patent: May 2, 2023

(54) SYSTEM AND METHOD FOR ENHANCED SURVEILLANCE USING VIDEO ANALYTICS

(71) Applicant: Rosemount Aerospace Inc., Burnsville, MN (US)

(72) Inventors: Nitin Kumar Goyal, Karnataka (IN); Joseph T. Pesik, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 92 days.

(21) Appl. No.: 17/149,180

(22) Filed: Jan. 14, 2021

(65) Prior Publication Data

US 2022/0121838 A1    Apr. 21, 2022

(30) Foreign Application Priority Data

Oct. 20, 2020  (IN)  .............................. 202041045727

(51) Int. Cl.
*G06T 5/00* (2006.01)
*G06V 40/16* (2022.01)
(Continued)

(52) U.S. Cl.
CPC .............. *G06V 40/161* (2022.01); *G06T 5/00* (2013.01); *G06T 7/155* (2017.01); *G06T 7/194* (2017.01); *G06T 7/20* (2013.01); *G06V 20/59* (2022.01); *G06V 40/28* (2022.01); *H04N 7/181* (2013.01); *H04N 7/183* (2013.01); *G06T 2207/30268* (2013.01)

(58) Field of Classification Search
CPC .... G06V 40/161; G06V 40/28; G06V 40/103; G06V 40/174; G06V 40/23; G06V 20/59; G06V 20/52; G06V 10/764; G06T 5/00; G06T 7/155; G06T 7/194; G06T 7/20; G06T 2207/30268; H04N 7/181; H04N 7/183; B64D 45/0051
See application file for complete search history.

(56) References Cited

U.S. PATENT DOCUMENTS 6,844,817 B2   1/2005   Gleine
7,878,586 B2   2/2011   Kneller et al.
(Continued)

FOREIGN PATENT DOCUMENTS

CN   105700682 A  *  6/2016  .............. G06F 3/011
CN   105912975 A  *  8/2016  .............. B64D 47/08
(Continued)

OTHER PUBLICATIONS

Extended European Search Report for EP Application No. 21203801.0, dated Mar. 17, 2022, 11 pages.

*Primary Examiner* — Matthew C Bella
*Assistant Examiner* — Kathleen M Broughton
(74) *Attorney, Agent, or Firm* — Kinney & Lange, P.A.

(57) ABSTRACT

A method of monitoring an aircraft interior includes capturing an image using at least one camera mounted within the fuselage of the aircraft, the image being a captured image including individual image frames. The method further includes modifying the captured image and generating an optimized image using an image processing module, detecting an animate object within the optimized image and identifying features of the animate object using an object detection module, and displaying the optimized using a display module.

20 Claims, 3 Drawing Sheets

(51) Int. Cl.
   *G06T 7/194*   (2017.01)
   *G06T 7/155*   (2017.01)
   *G06V 20/59*   (2022.01)
   *G06V 40/20*   (2022.01)
   *G06T 7/20*    (2017.01)
   *H04N 7/18*    (2006.01)

(56) References Cited

U.S. PATENT DOCUMENTS

| | | |
|---|---|---|
| 10,313,635 B2 | 6/2019 | Paliga et al. |
| 10,691,955 B1 | 6/2020 | Correia Gracio et al. |
| 2006/0190419 A1 | 8/2006 | Bunn et al. |
| 2017/0068863 A1* | 3/2017 | Rattner ................. G06V 40/10 |
| 2017/0113801 A1 | 4/2017 | Brunaux et al. |
| 2017/0161957 A1* | 6/2017 | Yajima .................... G06F 3/011 |
| 2019/0124369 A1* | 4/2019 | Lüdtke .................. G06F 3/1423 |
| 2019/0177004 A1 | 6/2019 | Skelly et al. |
| 2019/0253671 A1* | 8/2019 | Miyanaka ............ G06V 40/168 |
| 2020/0031474 A1 | 1/2020 | Sivignon et al. |
| 2020/0079524 A1 | 3/2020 | Escobar et al. |
| 2020/0311437 A1 | 10/2020 | Mehrholz et al. |

FOREIGN PATENT DOCUMENTS

| | | |
|---|---|---|
| CN | 107347146 A | 11/2017 |
| DE | 102016200412 A1 * | 8/2017 |
| JP | 2017101488 A * | 6/2017 |

* cited by examiner

SYSTEM AND METHOD FOR ENHANCED SURVEILLANCE USING VIDEO ANALYTICS

BACKGROUND

The disclosed subject matter relates generally to video surveillance systems, and more particularly, to an enhanced system and method for monitoring an aircraft cabin.

Many passenger aircraft use video surveillance systems for monitoring on-board activities. Typical systems include a live video feed that must be monitored and analyzed by a crewmember to distinguish typical passenger behavior from behavior that is abnormal, dangerous, and/or indicative of distress. Active monitoring of the surveillance system is an additional duty for the flight crew which can interfere with or distract from other duties. Conversely, this practice can also increase the possibility of missing a critical activity as crewmembers are often occupied with other tasks. In recent years, dangerous activities, such as the attempted opening of exit doors during flight, as well as incidents of passenger distress have led to increased safety concerns for airlines. As such, a need exists for enhanced cabin monitoring systems that require less active monitoring by the flight crew.

SUMMARY

A method of monitoring an aircraft interior includes capturing an image using at least one camera mounted within the fuselage of the aircraft, the image being a captured image including individual image frames. The method further includes modifying the captured image and generating an optimized image using an image processing module, detecting an animate object within the optimized image and identifying features of the animate object using an object detection module, and displaying the optimized using a display module.

An aircraft surveillance system includes at least one camera mounted within a fuselage of the aircraft and configured to capture an image as a captured image, an image processing module configured to modify the captured image to generate an optimized image, an object detection module configured to detect an animate object within the optimized image to identify features of the animate object, an activity classifier module configured to analyze features and motion data of the animate object, and a display module in data communication with the activity classifier and configured to display the optimized image.

Figure 1:
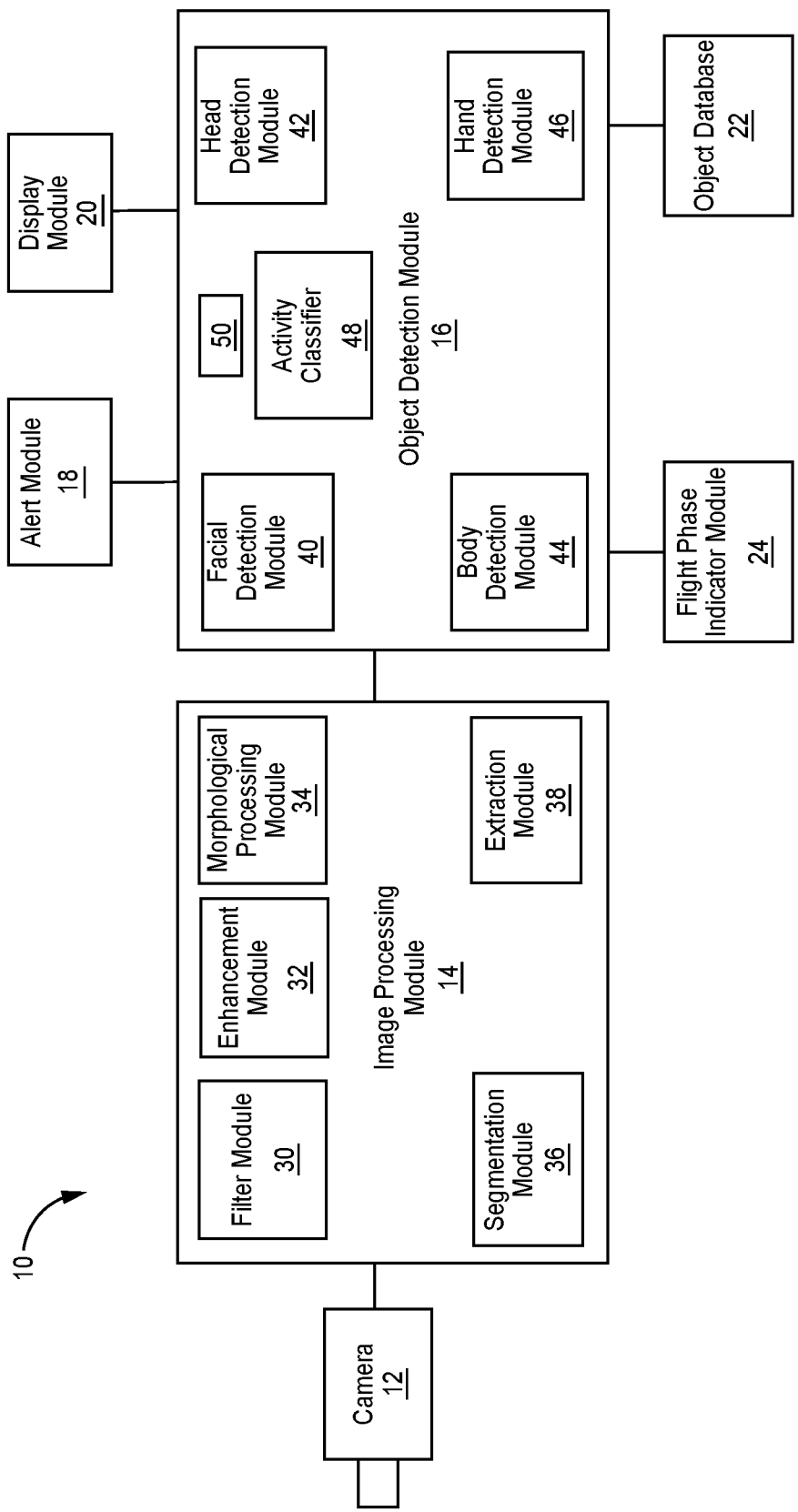
FIG. 1 is a schematic block diagram of select components of an aircraft surveillance system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents an aircraft surveillance system that uses video analytics to distinguish undesirable or helpful passenger behavior from unimportant behavior (i.e., routine or otherwise not requiring immediate attention). The system can process and enhance captured images, detect and analyze passenger features and movements, and generate an alert, as necessary, depending on threshold parameters. This is accomplished using various sensors and algorithms arranged as a series of modules within the surveillance system. System sensitivity and reliability can be fine-tuned based on, for example, the number and type of modules used.

FIG. 1 is a schematic block diagram of an exemplary embodiment of surveillance system 10. As shown, system 10 includes camera 12, image processing module 14, object detection module 16, alert module 18, display device 20, object database 22, and flight phase indicator module 24.

Figure 2:
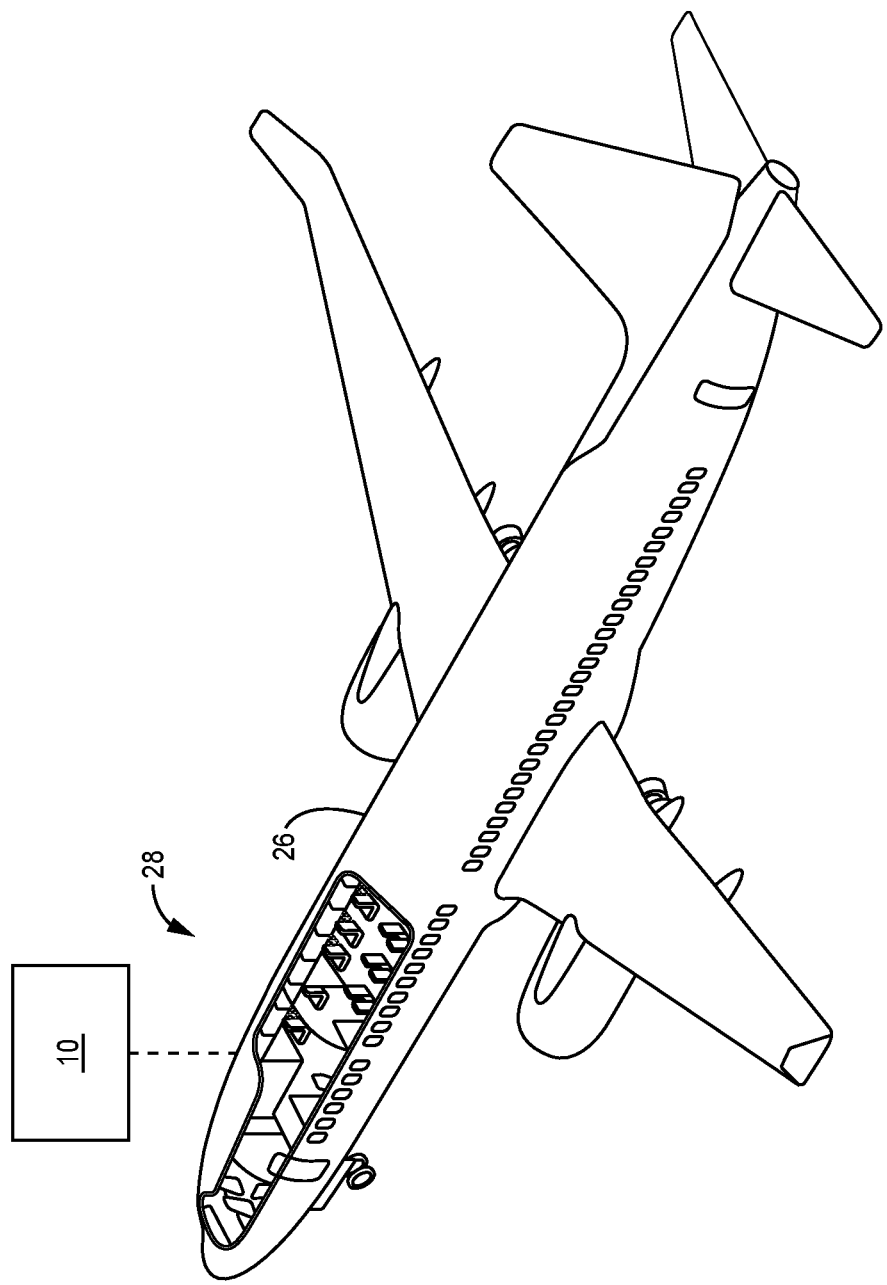
FIG. 2 is a cutaway illustration of an aircraft that can include the surveillance system.

As depicted in FIG. 1, system 10 is a video surveillance system for capturing imagery within fuselage 26 of aircraft 28, shown in FIG. 2, and more specifically, for capturing imagery of the cabin of a passenger aircraft. Camera 12 can be mounted within the cabin such that it has a line-of-sight on a passenger area (e.g., seating area, emergency exit aisle, lavatory and/or exit door, etc.). Suitable mounting locations can include fore and/or aft regions of the cabin such as a galley. Such locations can, for example, provide an ideal viewing position of the seating areas as well as aisles. Camera 12 can be a real-time digital image capture device such as a high-definition video camera with a field of view greater than 60 degrees in the horizontal and vertical direction, although other cameras can be used depending on system requirements. Camera 12 is configured to provide a video signal representative of captured imagery as a series of successive image frames. Further, depending on the size of the aircraft, system 10 can include more than one camera 12 positioned in different parts of the cabin to capture various views and angles of passenger areas. Although FIG. 1 schematically illustrates only one camera 12, the overall architecture of system 10 can be extended to include any number of separate cameras 12, without departing from the scope of the following disclosure.

Image processing module 14 processes images (i.e., one or more image frames) captured by camera(s) 12 and can include various associated submodules for this purpose. Image processing can modify the images to improve/optimize image quality and/or format the image as necessary for analysis and display. For example, image processing module 14 can include one or a combination of filter module 30, enhancement module 32, morphological processing module 34, segmentation module 36, and extraction module 38. The modules work to process images through execution of various algorithms and techniques. Filter module 30 can be used to extract image frames, as desired, from the video signal provided by camera(s) 12. This can be accomplished by selecting a predetermined extraction pattern based on frames per unit of time, randomly selected, or selected using some other threshold parameters. Enhancement module 32 can use an algorithmic approach to correct color, distortion, blurriness, contrast, etc. of captured images. Morphological processing module 34 can perform morphological operations to correct image issues with noise and texture. More specifically, morphological processing module can perform operations such as dilation to increase visibility and/or fill in gaps of image objects, and erosion to strip away small objects to make substantive image objects clearer. Segmentation module 36 can partition the image into segments based on, for example, a desired region of interest. This can be done, for example, using a pixel clustering algorithm. Extraction module 38 can extract and subtract background features to allow for detection and extraction of the image foreground. In some embodiments, a baseline image (e.g., an empty seating area) can be captured and used to facilitate background extraction.

Image processing module 14 can be wholly or partially incorporated into camera(s) 12. That is, one or more submodules can be configured as in-camera processors or circuits (e.g., CMOS sensors, gate arrays, integrated circuits, etc.). Alternatively, image processing module 14 can be implemented as a central processor. A central processor can be particularly suitable, for example, in a multi-camera system 10 with multiple image feeds. Further, in other embodiments, any of the image processing submodules can be combined or omitted, and other types of image processing submodules not mentioned here can also be included.

Object detection module 16 works to detect and analyze animate (e.g., humans such as passengers or crewmembers) and inanimate image objects (e.g., aircraft fixtures) to identify potential alertable activities. Like image processing module 14, object detection module 16 can include one or more submodules, such as facial detection module 40, head detection module 42, body detection module 44, hand detection module 46, and activity classifier module 48. Facial detection module 40 can detect a human face using, for example, a principal component analysis (PCA) approach. Detection can include position of the face (e.g., forward or side facing). Facial detection module 40 further includes facial gesture detection capabilities using a pre-trained machine learning algorithm to detect facial expressions (e.g., smiling, frowning, eyes open or closed, etc.) which can be indicative of an individual's mood. Head detection module 42 and body detection module 44 can similarly detect a position of the individual's head and body, respectively, and the orientation (i.e., front, back, or side) of the head and/or body with respect to camera(s) 12. Each can include motion sensing capabilities through software or independent sensor input depending on the system. Body detection module 44 can further detect direction and speed of motion to provide data on passenger movements within the aircraft. Hand detection module 46 can detect an individual's hand(s) and specific hand movements or gestures using pre-trained machine learning algorithms. Hands can be particularly revealing, as an individual's hands might be used to get the attention of a crewmember or signal distress and can also be used to reach for a weapon or a door handle. The pre-trained algorithms can be configured to recognize unimportant or routine hand movements (e.g., reaching to adjust overhead controls, eating, drinking, etc.). One or more submodules can further include proximity detection means to detect the proximity of an individual's hand, body, etc. to, for example, a restricted area or object. Like image processing module 14, any of the object detection submodules can be combined or omitted, and other types of object detection submodules not mentioned here can also be included.

Activity classifier 48 classifies activities based on object detection module 16 data. Activity classifier 48 can include pre-trained machine learning modules to compare motion and feature data against known scenarios to identify alertable activities (i.e., those activities for which the system is configured to generate an alert). The threshold for an alertable activity can be customized based on the type of aircraft and/or safety requirements, to name a few non-limiting examples. Additionally, the threshold can vary based on the flight phase as is discussed in more detail below. A decision-making algorithm associated with activity classifier module 48 can generate an alert via alert module 18. In an exemplary embodiment, the alert can be in the form of a warning light (blinking or fixed) and/or a bounding box appearing on the image displayed on display module 20. The bounding box can, for example, appear around a suspicious passenger, a specific body part, a restricted area, etc., to call a crewmember's attention to the activity. Other types of alerts are also contemplated herein. Display module 20 can include a fixed or portable video display and can further include multiple displays depending on factors such as aircraft size and capacity.

Object database 22 and flight phase indicator module 24 help optimize system 10. Object database 22 can include various objects (e.g., humans, a seat, a door, etc.) to facilitate the operations of object detection module 16. Object database 22 can be configured as a processor or memory. Flight phase indicator module 24 can be used to vary the sensitivity level (i.e., threshold level of certain alertable activities based) of system 10 based on the flight phase of aircraft 28. For example, a passenger standing near the cabin door may not require an alert when aircraft 28 is on the ground and passengers are moving into/out of the aircraft, but could be an alertable activity during take-off, cruise, and/or descent. As such, flight phase indicator module 24 can include inputs from existing aircraft sensors and/or avionics systems (e.g., weight on wheels, altitude, air speed, fasten seat belt indicator, door open/closed, etc.) indicative of the aircraft's status. In an alternative embodiment, flight phase indicator can include its own sensors (e.g., position, speed, altitude, etc.) for determining flight phase, or it can be omitted from system 10. It may be desirable for other objects and activities (e.g., a weapon, a passenger indicating distress, a person or object blocking an aisle, etc.) to remain alertable at any phase of flight, and as such, system 10 can be configured to vary the threshold of targeted activities based on flight phase, while leaving others at a constant level.

In some embodiments, the various machine learning modules of system 10 can be enhanced using un-clustered learning module 50 to analyze collected data to learn/identify new activities. Activities not already incorporated into pre-trained algorithms (i.e., new activities) can be recorded by un-clustered learning module 50 and used to further train the pre-trained algorithms for future usage. Such updating/training can be done, for example, during maintenance or other scheduled intervals to improve the reliability of system 10.

Additionally, some embodiments of system 10 can be real-time only for video but can be configured to capture a log of alertable activities. This can include screen shots of an object and/or activity being observed. System 10 can further include a means of recording data for later playback, further analysis, and/or machine learning training.

Figure 3:
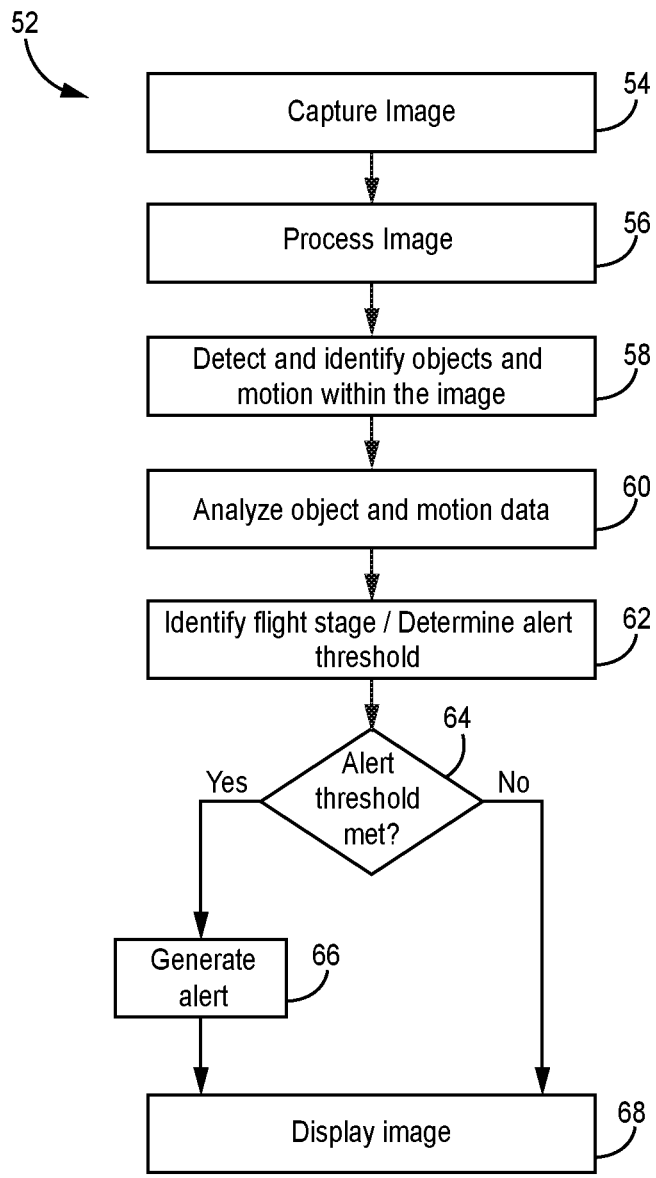
FIG. 3 is a flow diagram illustrating selected steps of a video analytics method performed by the aircraft surveillance system.

FIG. 3 is a flow diagram illustrating selected steps of a video analytics method 52 for analyzing images captured by system 10. At step 54, camera 12 captures an image which can be represented as one or a series of image frames. At step 56, the captured image is processed by image processing module 14 to modify the image and generate an optimized image for further analysis and display. At step 58, object detection module 16 detects and identifies objects and any corresponding motion of objects within the image. Detected objects may be animate (e.g., a passenger) or inanimate (e.g., a piece of luggage). At step 60, activity classifier module 48 analyzes the object and motion data and compares the data to known scenarios. At step 62, flight phase data can be updated/input to help set an alert threshold for various objects and activities. At step 64, it is determined by, for example, a decision-making algorithm associated with activity classifier 48, if an alert threshold is met for detected objects and activities. If an alert threshold is met, an alert is generated via alert module 18 at step 66. At step 68, display module 20 displays the optimized/analyzed image. Steps 66 and 68 can happen generally simultaneously, and step 68 can be carried out independently of step 66. Other steps of method 52 can also be performed sequentially or generally simultaneously based on, for example, system configuration or detected data.

Surveillance system 10 can be used to increase the safety of a flight with a lower burden on crewmembers than existing surveillance systems. System 10 is highly customizable for use in many types of aircraft and can reduce the cost to the airlines caused by in-flight incidents. Although discussed primarily in the context of commercial aviation, the disclosed system can be used in other types of vehicle-based camera and surveillance systems.

Discussion of Possible Embodiments

The following are non-exclusive descriptions of possible embodiments of the present invention.

A method of monitoring an aircraft interior includes capturing an image using at least one camera mounted within the fuselage of the aircraft, the image being a captured image including individual image frames. The method further includes modifying the captured image and generating an optimized image using an image processing module, detecting an animate object within the optimized image and identifying features of the animate object using an object detection module, and displaying the optimized using a display module.

The method of the preceding paragraph can optionally include, additionally and/or alternatively, any one or more of the following features, configurations and/or additional components:

The above method can further include generating an alert signal using an alert module if the activity classifier module identifies an alertable activity based at least partially on the identified features or motion data.

In any of the above methods, generating an alert signal can include at least one of activating an indicator light and positioning a bounding box on a portion of the optimized image displayed by the display module.

Any of the above methods can further include at least partially basing identification of the alertable activity on a flight phase of the aircraft.

In any of the above methods, modifying the captured image can include at least one of extracting select frames of the captured image using a filter module, enhancing the captured image using an image enhancement module, performing morphological operations on the captured image using a morphological processing module, partitioning the captured image using an image segmentation module, and distinguishing a foreground of the captured image from a background of the image using an extraction module.

In any of the above methods, the object detection module can further be configured to detect an inanimate object such as an aircraft fixture.

In any of the above methods, the animate object can be an aircraft passenger.

In any of the above methods, detecting and analyzing the animate object can include at least one of detecting and analyzing a face of the passenger using a facial detection module, detecting a head of the passenger and motion of the head using a head detection module, detecting a body of the passenger and motion of the body using a body detection module, detecting a hand of the passenger and motion of the hand using a hand detection module.

Any of the above methods can further include detecting a proximity of the hand to the inanimate object.

Any of the above methods can further include comparing image data to pre-programmed data within an object database.

An aircraft surveillance system includes at least one camera mounted within a fuselage of the aircraft and configured to capture an image as a captured image, an image processing module configured to modify the captured image to generate an optimized image, an object detection module configured to detect an animate object within the optimized image to identify features of the animate object, an activity classifier module configured to analyze features and motion data of the animate object, and a display module in data communication with the activity classifier and configured to display the optimized image.

The system of the preceding paragraph can optionally include, additionally and/or alternatively, any one or more of the following features, configurations and/or additional components:

The above system can further include an alert module configured to generate an alert signal if the activity classifier module identifies an alertable activity based at least partially on the identified features or motion data.

In any of the above systems, the alert signal can include at least one of an indicator light and a bounding box on a portion of the optimized image displayed on the display device.

In any of the above systems, the image processing module can include at least one of an image filter module configured to extract frames of the captured image, an image enhancement module, a morphological processing module, and an extraction module configured to distinguish an image foreground from an image background.

Any of the above systems can further include an object database, and a flight phase indicator module configured to provide information about a flight phase of the aircraft.

In any of the above systems, the animate object can be an aircraft passenger, and the object detection module can include at least one of a facial detection module configured to detect a face of the passenger and analyze facial gestures, a head detection module configured to detect a head of the passenger and motion of the head, a body detection module configured to detect a body of the passenger and motion of the body, and a hand detection module configured to detect a hand of the passenger and motion of the hand.

In any of the above systems, the hand detection module can further be configured to detect a proximity of the hand to an inanimate object such as a door.

Any of the above systems can further include an unclustered learning module configured to analyze object and motion data to identify new activities.

In any of the above systems, the at least one camera can include a plurality of cameras.

In any of the above systems, the display module can include a fixed or portable video display.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of monitoring an aircraft interior, the method comprising, in order:
   determining a frame extraction pattern;
   capturing a video signal from at least one camera mounted within a fuselage of the aircraft, the video signal comprising individual image frames;
   modifying the video signal and generating an optimized image using an image processing module, wherein modifying the video signal comprises extracting, based on the frame extraction pattern, select individual frames of the video signal using a filter module;
   detecting a human within the optimized image and identifying features of the human using an object detection module, wherein identifying features of the human comprises:
      detecting and analyzing a face of the human using a facial detection module; and
      detecting facial expressions of the face indicative of a mood of the human using a pre-trained machine learning algorithm of the facial detection module;
   analyzing features or motion data of the human using an activity classifier module; and
   displaying the optimized image using a display module.

2. The method of claim 1 and further comprising: generating an alert signal using an alert module if the activity classifier module identifies an alertable activity based at least partially on the identified features or motion data.

3. The method of claim 2, wherein generating an alert signal comprises at least one of activating an indicator light and positioning a bounding box on a portion of the optimized image displayed by the display module.

4. The method of claim 2 and further comprising: at least partially basing identification of the alertable activity on a flight phase of the aircraft.

5. The method of claim 1, wherein modifying the video signal further comprises at least one of:
   enhancing the video signal using an image enhancement module;
   performing morphological operations on the video signal using a morphological processing module;
   partitioning the video signal using an image segmentation module; and
   distinguishing a foreground of the video signal from a background of the image using an extraction module.

6. The method of claim 1, wherein the object detection module is further configured to detect an inanimate object such as an aircraft fixture.

7. The method of claim 6, wherein the human is an aircraft passenger.

8. The method of claim 7, wherein detecting and analyzing the human further comprises at least one of:
   detecting a head of the passenger and motion of the head using a head detection module;
   detecting a body of the passenger and motion of the body using a body detection module;
   detecting a hand of the passenger and motion of the hand using a hand detection module; and
   detecting a proximity of the hand to the inanimate object.

9. The method of claim 1 and further comprising: comparing image data to pre-programmed data within an object database.

10. The method of claim 1, wherein the frame extraction pattern is:
    based on frames per unit of time; or
    based on a random selection.

11. An aircraft surveillance system comprising:
    at least one camera mounted within a fuselage of the aircraft and configured to capture a video signal comprising individual image frames;
    an image processing module configured to modify the video signal to generate an optimized image, the image processing module comprising an image filter module configured to extract select individual frames of the video signal based on a frame extraction pattern determined prior to capturing the video signal;
    an object detection module configured to detect a human within the optimized image to identify features of the human, wherein identifying features of the human comprises:
       detecting and analyzing a face of the human using a facial detection module; and
       detecting facial expressions of the face indicative of a mood of the human using a pre-trained machine learning algorithm of the facial detection module;
    an activity classifier module configured to analyze features and motion data of the human; and
    a display module in data communication with the activity classifier and configured to display the optimized image.

12. The system of claim 11 and further comprising: an alert module configured to generate an alert signal if the activity classifier module identifies an alertable activity based at least partially on the identified features or motion data.

13. The system of claim 12, wherein the alert signal comprises at least one of an indicator light and a bounding box on a portion of the optimized image displayed on the display device.

14. The system of claim 11, wherein the image processing module further comprises at least one of:
    an image enhancement module;
    a morphological processing module;
    and image segmentation module; and
    an extraction module configured to distinguish an image foreground from an image background.

15. The system of claim 11 and further comprising:
    an object database; and
    a flight phase indicator module configured to provide information about a flight phase of the aircraft.

16. The system of claim 11, wherein the human is an aircraft passenger, and wherein the object detection module further comprises at least one of:
    a head detection module configured to detect a head of the passenger and motion of the head;
    a body detection module configured to detect a body of the passenger and motion of the body; and
    a hand detection module configured to detect a hand of the passenger and motion of the hand.

17. The system of claim 16, wherein the hand detection module is further configured to detect a proximity of the hand to an inanimate object such as a door.

18. The system of claim 11 and further comprising: an un-clustered learning module configured to analyze object and motion data to identify new activities.

19. The system of claim 11, wherein the at least one camera comprises a plurality of cameras.

20. The system of claim 11, wherein the frame extraction pattern is:
- based on frames per unit of time; or
- based on a random selection.

* * * * *